US010770026B2

(12) United States Patent
Shin et al.

(10) Patent No.: US 10,770,026 B2
(45) Date of Patent: Sep. 8, 2020

(54) DISPLAY DEVICE, AND SOURCE DRIVER AND PACKET RECOGNITION METHOD THEREOF

(71) Applicant: SILICON WORKS CO., LTD., Daejeon (KR)

(72) Inventors: Ju Young Shin, Daejeon (KR); Sang Min Lee, Daejeon (KR); Su Hun Yang, Gwangmyeong-si (KR); Jeung Hie Choi, Cheongju-si (KR)

(73) Assignee: Silicon Works Co., Ltd., Daejeon-si (KR)

( * ) Notice: Subject to any disclaimer, the term of this patent is extended or adjusted under 35 U.S.C. 154(b) by 0 days.

(21) Appl. No.: 16/469,460

(22) PCT Filed: Dec. 12, 2017

(86) PCT No.: PCT/KR2017/014498
§ 371 (c)(1),
(2) Date: Jun. 13, 2019

(87) PCT Pub. No.: WO2018/110924
PCT Pub. Date: Jun. 21, 2018

(65) Prior Publication Data

US 2020/0111444 A1 Apr. 9, 2020

(30) Foreign Application Priority Data

Dec. 14, 2016 (KR) ........................ 10-2016-0170256

(51) Int. Cl.
*G06F 3/038* (2013.01)
*G09G 5/00* (2006.01)
(Continued)

(52) U.S. Cl.
CPC ........... *G09G 5/008* (2013.01); *G09G 3/3275* (2013.01); *G09G 3/3688* (2013.01); *G09G 2310/08* (2013.01); *G09G 2370/10* (2013.01)

(58) Field of Classification Search
CPC .. G09G 2310/08; G09G 2370/10; G09G 3/20; G09G 3/3275; G09G 3/36; G09G 3/3688; G09G 5/008
See application file for complete search history.

(56) References Cited

U.S. PATENT DOCUMENTS 9,514,713 B2 12/2016 Lee et al.
2005/0140619 A1 6/2005 Hong
(Continued)

FOREIGN PATENT DOCUMENTS

JP 1997237076 A 9/1997
KR 20100011641 A 2/2010
(Continued)

OTHER PUBLICATIONS

International Search Report and Written Opinion; PCT No. PCT/KR2017/014498; dated Mar. 15, 2018.
(Continued)

*Primary Examiner* — Insa Sadio
(74) *Attorney, Agent, or Firm* — Polisnelli PC

(57) ABSTRACT

Disclosed are a display device, and a source driver and a packet recognition method thereof. In the display device, when check information of a control data packet of transmitted transmission data is normal, a control data packet of to be restored is updated with a control data packet of a current cycle, and when the check information is abnormal, the control data packet to be restored is maintained, so that it is possible to normally drive a source signal even through there is an error or a change in the control data packet.

20 Claims, 4 Drawing Sheets

(51) Int. Cl.
*G09G 3/3275* (2016.01)
*G09G 3/36* (2006.01)

(56) References Cited

U.S. PATENT DOCUMENTS

| | | | | |
|---|---|---|---|---|
| 2010/0156885 | A1 | 6/2010 | Cho et al. | |
| 2012/0166896 | A1* | 6/2012 | Oh | G09G 5/008 714/705 |
| 2014/0118235 | A1* | 5/2014 | Hong | G09G 5/008 345/87 |
| 2015/0187315 | A1 | 7/2015 | Park | |

FOREIGN PATENT DOCUMENTS

| | | | |
|---|---|---|---|
| KR | 101370344 | B1 | 3/2014 |
| KR | 20160116262 | A | 10/2016 |
| WO | 2018110924 | A1 | 6/2018 |

OTHER PUBLICATIONS

English abstract of KR20160116262; retrieved from www.espacenet.com on Jun. 12, 2019.
English abstract of KR20100011641; retrieved from www.espacenet.com on Jun. 12, 2019.
English translation of abstract for JP1997237076.
English abstract of KR101370344; retrieved from www.espacenet.com on Jun. 12, 2019.
Translated Written Opinion for PCT No. PCT/KR2017/014498.

* cited by examiner

Fig. 7

| | CONTROL DATA PACKET +CHECK INFORMATION | | | | | | | UPDATE DETERMINE | | |
|---|---|---|---|---|---|---|---|---|---|---|
| | C1 | C1 | C1 | ··· | Cn-2 | Cn-1 | Cn | CASE1 | CASE2 | CASE3 |
| P1 → | L | L | L | ··· | L | L | L | Update | Keep | Keep |
| | L | L | H | ··· | L | H | H | Keep | Keep | Keep |
| P3 → | L | H | L | ··· | H | L | L | Keep | Keep | Update |
| | ····· | | | | | | | | ····· | |
| | H | L | L | ··· | H | L | L | Keep | Keep | Keep |
| | H | H | L | ··· | L | H | H | Keep | Keep | Keep |
| P2 → | H | H | H | ··· | H | H | H | Keep | Update | Keep |

DISPLAY DEVICE, AND SOURCE DRIVER AND PACKET RECOGNITION METHOD THEREOF

BACKGROUND

1. Technical Field

The present disclosure relates to a display device, and more particularly, to a display device that ensures the stability of an operation even when an error or a change in a control data packet occurs, and a source driver and a packet recognition method thereof.

2. Related Art

A display device includes a timing controller and a source driver.

The timing controller transmits transmission data including a clock, control data, and display data. The source driver may be provided in a plural number with respect to a display panel and generates a source signal for driving the display panel by using the transmission data.

Communication of the transmission data between the timing controller and the source driver may be performed in various ways. For example, the transmission data may be transmitted from the timing controller to the source driver in a clock embedded data signaling (CEDS) method. The CEDS method refers to a communication method in which the transmission data is packetized to have a format in which a clock is embedded in data and the transmission data including the packet is transmitted.

The transmission data includes a clock training packet, a display data packet, and a control data packet. The clock training packet includes a clock, the display data packet includes display data for implementing an image on a display panel, and the control data packet includes control data required for driving the display data as a source signal.

The control data packet may include inaccurate control data due to a data allocation error in the timing controller. Furthermore, the control data packet may be changed due to the influence of surge or noise during transmission from the timing controller to the source driver.

When an error or a change in the control data packet occurs due to the above reasons, the source driver may not normally process the display data and may not normally provide the display panel with a source signal for displaying an image.

In general, the display device does not provide a method for preventing or recognizing an error or a change in the control data packet.

Therefore, in the general display device, when the control data packet is abnormally received in the source driver, it is difficult to normally drive the source driver and output the source signal due to the abnormal control data.

SUMMARY

Various embodiments are directed to a display device capable of determining whether there is an error or a change in a control data packet of received transmission data, and a source driver and a packet recognition method thereof.

Various embodiments are directed to a display device that allows a source driver to stably drive a source signal even when there is an error or a change in a control data packet of received transmission data, and the source driver and a packet recognition method thereof.

Various embodiments are directed to a display device that allows a source driver to stably drive a source signal by controlling the update of a control data packet of received transmission data when there is an error or a change in the control data packet, and the source driver and a packet recognition method thereof.

In an embodiment, a display device includes: a timing controller configured to constitute a control data packet including check information and transmits transmission data cyclically including the control data packet; and a source driver configured to receive the transmission data, update, when the check information of a first control data packet of a current cycle is normal, a second control data packet to be restored, with the first control data packet, and maintain, when the check information of the first control data packet of the current cycle is abnormal, the second control data packet at a state of a previous cycle.

In an embodiment, a source driver of a display device includes: a clock-data restoring block configured to receive transmission data cyclically including a clock training packet, a control data packet, and a display data packet, update, when check information included in a first control data packet of a current cycle is normal, a second control data packet with the first control data packet, maintain, when the check information of the first control data packet of the current cycle is abnormal the second control data packet at a state of a previous cycle, restore a clock signal from the clock training packet, and restore control data of the second control data packet and display data of the display data packet; and a display data processing block configured to output a source signal by using the clock signal, the control data, and the display data.

In an embodiment, a packet recognition method of a display device includes: a step in which a timing controller configures a control data packet including check information and transmits transmission data cyclically including the control data packet; a step in which a source driver receives the transmission data and determines whether the check information of a first control data packet of a current cycle is normal; a step in which, when the check information of the first control data packet of the current cycle is normal, the source driver updates a second control data packet into the first control data packet; and a step in which, when the check information of the first control data packet of the current cycle is abnormal, the source driver maintains the second control data packet at a state of a previous cycle.

According to the present disclosure, it is possible to determine an error or a change in the control data packet of received transmission data by using check information specified in the control data packet in advance, and to prevent the source driver from abnormally operating due to a control data packet, in which the error or the change has occurred, by controlling the update of the control data packet.

BRIEF DESCRIPTION OF THE DRAWINGS

FIG. 7 is a table for explaining the control method of FIG. 6.

DETAILED DESCRIPTION

Figure 1:
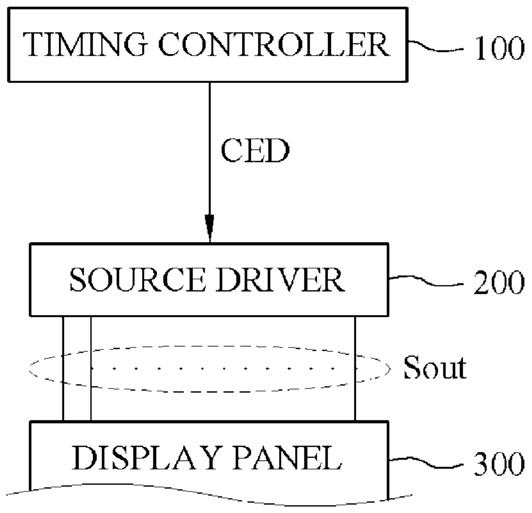
FIG. 1 is a block diagram illustrating an embodiment of a display device of the present disclosure.

Hereafter, embodiments of the present disclosure will be described in detail with reference to the accompanying drawings. The terms used in this specification and claims are not interpreted as being limited to typical or dictionary meanings, but should be interpreted as meanings and concepts which coincide with the technical idea of the present disclosure.

Embodiments described in this specification and configurations illustrated in the drawings are preferred embodiments of the present disclosure, and do not represent the entire technical idea of the present disclosure. Thus, various equivalents and modifications capable of replacing the embodiments and configurations may be provided at the time of filling the present application.

FIG. 1 is a block diagram illustrating an embodiment of a display device of the present disclosure.

Referring to FIG. 1, the display device of the present disclosure includes a timing controller 100, a source driver 200, and a display panel 300.

The timing controller 100 provides transmission data CED to the source driver 200.

Preferably, the transmission data CED has a clock embedded data signaling (CEDS) format in which a clock signal is embedded between data, and the clock signal and the data have the same amplitude.

The transmission data CED cyclically includes a clock training packet, a display data packet, and a control data packet. The clock training packet includes a clock, the display data packet includes display data RGB, and the control data packet includes control data for processing the display data RGB.

In order to embody the present disclosure, the timing controller 100 configures the control data packet including check information and transmits the transmission data CED cyclically including the control data packet.

The timing controller 100 may configure the check information by using a plurality of bits included in control data of the control data packet. The check information may be composed of a plurality of consecutive bits in bits of the control data or a plurality of bits including at least one non-consecutive bit, among the bits of the control data. Preferably, the plurality of bits included in the check information are configured to have the same logic value. The configuration of the aforementioned transmission data CED, control data packet, and check information will be described in detail below.

The source driver 200 may be configured in a plural number with respect to the timing controller 100 and the display panel 300.

The source driver 200 receives the transmission data CED and restores a clock signal and data from the transmission data CED, and the data includes display data and control data. Furthermore, the source driver 200 drives a source signal Sout by using the restored clock signal, display data, and control data, and provides the source signal Sout to the display panel 300.

Preferably, the display panel 300 is composed of a flat display panel such as a liquid crystal panel, an LED panel, and an OLED panel.

Figure 2:
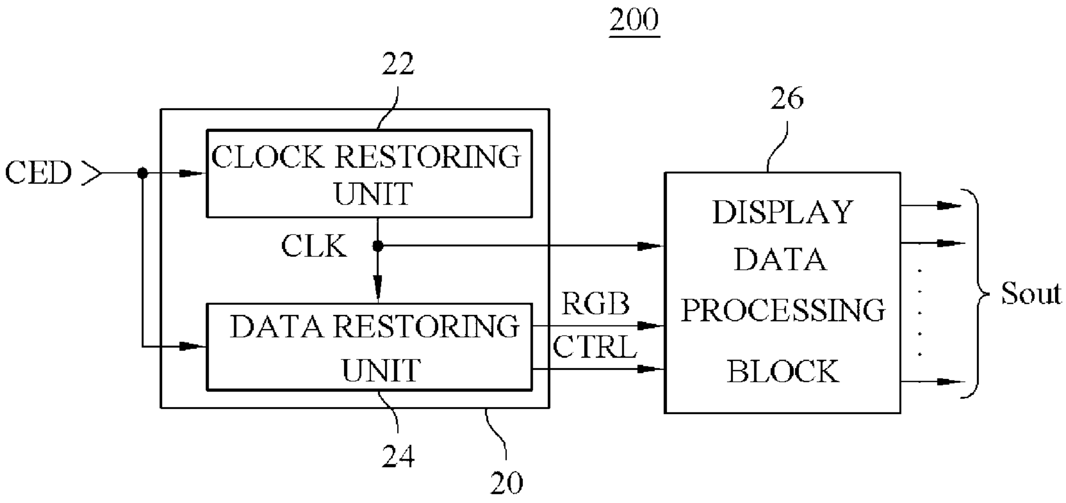
FIG. 2 is a block diagram illustrating an embodiment of a source driver of FIG. 1.

The source driver 200 may be configured as illustrated in FIG. 2, and FIG. 2 is a block diagram illustrating a schematic configuration of the source driver 200 that receives the transmission data CED, restores the clock signal, the display data, and the control data, and outputs the source signal Sout.

The transmission data CED received in the source driver 200 is configured in the timing controller 100. The transmission data CED cyclically includes the clock training packet, the control data packet, and the display data packet, the control data packet includes the control data, and the check information includes a plurality of specified bits among the bits of the control data. The transmission data CED is configured in a format in which a clock is embedded in data.

When the check information of a control data packet (hereinafter, referred to as a "first control data packet") of a current cycle is normal, the source driver 200 updates a control data packet to be restored (hereinafter, referred to as a "second control data packet") with the first control data packet. When the check information of the first control data packet of the current cycle is abnormal, the source driver 200 maintains the second control data packet at a state of a previous cycle.

Herein, it can be understood that the first control data packet is included in the transmission data CED and the second control data packet to be restored is for restoring control data CTRL to be transmitted from a data restoring unit 24 to a display data processing block 26. Preferably, the source driver 200 is configured to store a second control data packet of a previous cycle at a preset location in order to maintain the second control data packet in the state of the previous cycle when the check information of the first control data packet is abnormal.

When the value of the check information of the first control data packet of the current cycle is different from a value of check information before transmission, the source driver 200 determines that the value of the check information is not satisfied with a preset condition and thus the check information is abnormal.

The preset condition is set in order to determine whether the value of the check information is the same as that before the transmission of the first control data packet. In an example, when the source driver 200 stores reference information of a value corresponding to normal check information for comparison with check information, it can be understood that check information whose reference information has the same value corresponds to the preset condition. In another example, when the source driver 200 performs a preset logical logic to determine that a plurality of bits have the same logical value or check information expresses a specific value specified as a combination result, it can be understood that the check information corresponds to the preset condition.

To this end, the source driver 200 includes a clock-data restoring block 20 and the display data processing block 26, and the clock-data restoring block 20 includes a clock restoring unit 22 and the data restoring unit 24 as illustrated in FIG. 2.

Figure 3:
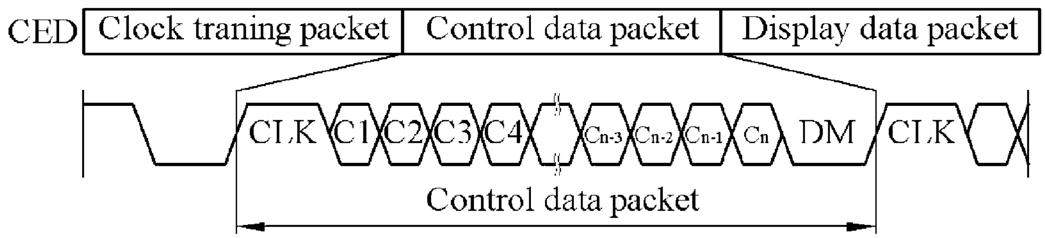
FIG. 3 is a diagram for explaining a format of transmission data.

The transmission data CED illustrated in FIG. 1 and FIG. 2 may be illustrated as in FIG. 3. The transmission data CED of FIG. 3 cyclically includes the clock training packet, the control data packet, and the display data packet.

The clock training packet includes only a clock and may be arranged in a vertical blank interval. Clock training for restoration of a clock signal CLK is performed by the clock training packet.

The clock restoring unit 22 receives the transmission data CED, and restores the clock signal CLK by using the clock of the clock training packet of FIG. 3 in correspondence to the vertical blank interval.

When the restoration of the clock signal CLK is completed, the clock restoring unit 22 sets a lock for the clock signal CLK and provides a stable clock signal CLK after the lock setting. The clock restoring unit 22 may be configured using a DLL, for example.

The control data packet includes control data with specified check information. The check information may be arranged between the bits of the control data packet or in either the first order or the last order of the bits of the control data packet.

With reference to FIG. 3, the configuration of the check information will be described. FIG. 3 illustrates that the control data packet includes a plurality of consecutive bits C1 to $C_n$ between the clock signal CLK and a dummy bit DM.

For example, the check information may be composed of 3 bits. More specifically, the check information may be specified as 3 bits of the first order of the consecutive bits C1 to $C_n$, that is, the bits C1 to C3.

Alternatively, the check information may be specified as 3 bits of the last order of the consecutive bits C1 to $C_n$, that is, the bits $C_{n-2}$ to $C_n$, or 3 bits arranged among the consecutive bits C1 to $C_n$, that is, the bits C5 to C7.

Alternatively, the check information may be composed of a plurality of bits including at least one non-consecutive bit, among the consecutive bits C1 to $C_n$. Specifically, the check information may be specified as C1, C3, and $C_n$.

As described above, a plurality of bits having a preset control function in the control data packet may be specified and recognized as the check information. That is, the check information may be used for the control function as control data and may be used in order to check a change in the control data packet.

The display data packet and the control data packet of FIG. 3 are restored by the data restoring unit 24 of FIG. 2. The data restoring unit 24 includes a serial parallel processing section 242 that restores the display data packet and the control data packet into display data RGB and control data CTRL, as illustrated in FIG. 4.

Figure 4:
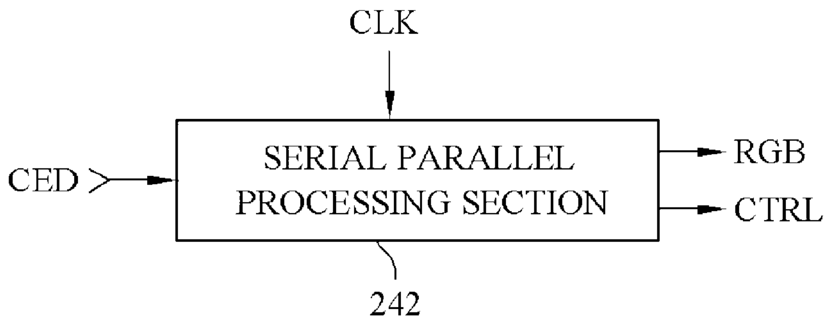
FIG. 4 is a block diagram for explaining the processing of a display data packet.

Referring to FIG. 4, the serial parallel processing section 242 restores control data of the control data packet and display data of the display data packet, which are serially arranged in the packet, by using the clock signal CLK, converts the restored data to be arranged in parallel, and provides the display data processing block 26 with the parallel control data CTRL and display data RGB.

The display data processing block 26 latches the parallel display data, converts the latched display data into an analog source signal Sout, and outputs the analog source signal Sout.

Figure 5:
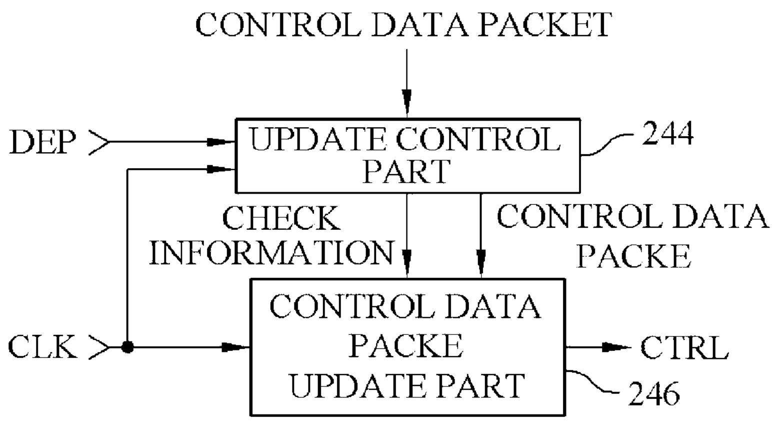
FIG. 5 is a block diagram for explaining the processing of a control data packet.

In order to process the control data packet, the serial parallel processing section 242 may include an update control part 244 that controls the update of the control data packet and a control data packet update part 246 that outputs the control data CTRL corresponding to the updated control data packet, as illustrated in FIG. 5.

Figure 6:
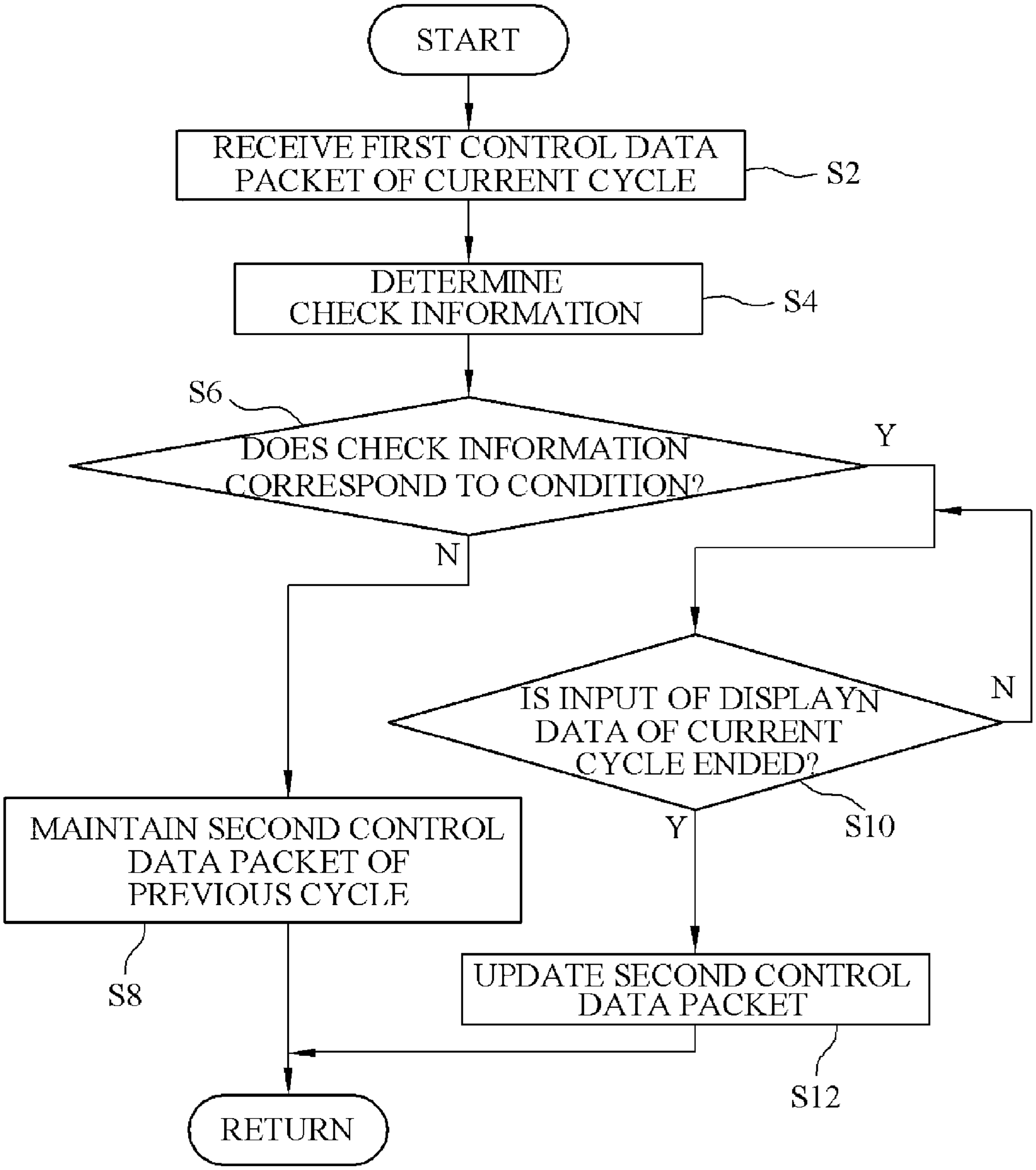
FIG. 6 is a flowchart for explaining an update control method of a control data packet.

The update control part 244 controls the control data packet update part 246 to update a second control data packet into a first control data packet. This will be described with reference to FIG. 6.

The update control part 244 receives a first control data packet of a current cycle (S2) and determines check information in synchronization with the clock signal CLK (S4). The update control part 244 controls the update of the second control data packet by the control data packet update part 246 according to whether the check information corresponds to the preset condition.

The update control part 244 checks whether the check information corresponds to the condition (S6), and determines that the first control data packet of the current cycle has been normally transmitted without the influence of surge or noise when the check information corresponds to the condition.

In such a case, the update control part 244 checks that all display data of a display data packet of the current cycle is inputted, through a display update end signal DEP (S10), and provides the first control data packet of the current cycle to the control data packet update part 246 after all the display data is inputted (S12).

In such a case, the control data packet update part 246 changes a second control data packet to be restored into the first control data packet of the current cycle. The display update end signal DEP can be understood as a signal generated in synchronization with the time point at which the output of the display data RGB from the serial parallel processing section 242 is ended.

Alternatively, the update control part 244 checks whether the check information corresponds to the condition (S6), and determines that the first control data packet of the current cycle has been changed due to the influence of surge or noise in the course of transmission when the check information does not correspond to the condition.

In such a case, the update control part 244 does not provide the first control data packet of the current cycle to the control data packet update part 246. In such a case, the control data packet update part 246 maintains a second control data packet of a previous cycle (S8).

As described above, the control data packet update part 246 may restore and output the control data CTRL corresponding to the second control data packet updated by the first control data packet of the current cycle or control data CTRL corresponding to the second control data packet maintaining the state of the previous cycle.

Meanwhile, the update control part 244 determines whether the check information corresponds to the specific condition and controls the update of the control data packet as described above. The determination of the check information and the determination of the update by the update control part 244 may be described with reference to FIG. 7.

Hereinafter, a description will be provided for a case where the check information is specified as 3 bits of the first order of the consecutive bits of the control data, that is, the bits C1 to C3. In such a case, when a condition that the check information C1 to C3 are all low (L) is satisfied as in P1 of the table of FIG. 7, the update control part 244 may determine that there is no change in the first control data packet of the current cycle.

Therefore, in a normal case of satisfying the condition that a plurality of bits specified as the check information C1 to C3 are all low (L), like CASE1, the update control part 244 provides the first control data packet of the current cycle to the control data packet update part 246 for update. However, in an abnormal case of not satisfying the condition that the plurality of bits specified as the check information C1 to C3 are all low (L), the update control part 244 does not provide the first control data packet of the current cycle to the control data packet update part 246.

Next, a description will be provided for a case where the check information is specified as 3 bits of the last order of the consecutive bits of the control data, that is, the bits $C_{n-2}$ to $C_n$. In such a case, when a condition that the check information $C_{n-2}$ to $C_n$ are all high (H) is satisfied as in P2 of the table of FIG. 7, the update control part 244 may determine that there is no change in the first control data packet of the current cycle.

Therefore, in a normal case of satisfying the condition that a plurality of bits specified as the check information $C_{n-2}$ to $C_n$ are all high (H), like CASE2, the update control part 244 provides the first control data packet of the current cycle to the control data packet update part 246 for update. However, in an abnormal case of not satisfying the condition that the plurality of bits specified as the check information $C_{n-2}$ to $C_n$ are all high (H), the update control part 244 does not provide the first control data packet of the current cycle to the control data packet update part 246.

Next, a description will be provided for a case where the check information is specified as non-consecutive 3 bits of the control data, that is, C1, C3, and $C_n$. In such a case, when a condition that the check information C1, C3, and $C_n$ are all low (L) is satisfied as in P3 of the table of FIG. 7, the update control part 244 may determine that there is no change in the first control data packet of the current cycle.

Therefore, in a normal case of satisfying the condition that the check information C1, C3, and $C_n$ are all low (L), like CASES, the update control part 244 provides the first control data packet of the current cycle to the control data packet update part 246 for update. However, in an abnormal case of not satisfying the condition that the plurality of bits specified as the check information C1, C3, and $C_n$ are all low (L), the update control part 244 does not provide the first control data packet of the current cycle to the control data packet update part 246.

As described above, in the embodiment of the present disclosure, it is possible to determine whether there is a change in a control data packet of a current cycle by determining check information of control data.

Furthermore, in the embodiment of the present disclosure, when there is a change in the control data packet of the current cycle, a control data packet for update is maintained at a state of a previous cycle, so that it is possible to ensure that the source driver normally drives display data as a source signal.

As a consequence, in the embodiment of the present disclosure, it is possible to prevent an abnormal operation of the source driver due to an error and a change in the control data packet, and to ensure the normal driving of the display panel.

What is claimed is:

1. A display device comprising:

a timing controller configured to constitute a control data packet including check information and transmits transmission data cyclically including the control data packet; and a source driver configured to receive the transmission data, update, when the check information of a first control data packet of a current cycle is normal, a second control data packet to be restored, with the first control data packet, and maintain, when the check information of the first control data packet of the current cycle is abnormal, the second control data packet at a state of a previous cycle.

2. The display device of claim 1, wherein, when a value of the check information of the first control data packet of the current cycle is different from a value of check information before transmission, the source driver determines that the value of the check information is not satisfied with a preset condition and thus the check information is abnormal.

3. The display device of claim 1, wherein the timing controller configures the check information by using a plurality of bits included in control data of the control data packet.

4. The display device of claim 3, wherein the check information is composed of a plurality of consecutive bits in bits of the control data.

5. The display device of claim 3, wherein the check information is composed of a plurality of bits including at least one non-consecutive bit, among the bits of the control data.

6. The display device of claim 3, wherein the plurality of bits included in the check information are configured to have the same logic value.

7. The display device of claim 1, wherein the timing controller configures the check information by using a plurality of consecutive bits in bits constituting the control data packet, and the check information is arranged between the bits of the control data packet or in either a first order or a last order of the bits of the control data packet.

8. The display device of claim 1, wherein, after all display data of a display data packet of the current cycle is inputted, the source driver updates the second control data packet into the first control data packet.

9. The display device of claim 8, wherein the source driver uses the second control data packet, which is updated or maintained in the current cycle, to control display data of the display data packet of a next cycle.

10. A source driver of a display device, comprising:

a clock-data restoring block configured to receive transmission data cyclically including a clock training packet, a control data packet, and a display data packet, update, when check information included in a first control data packet of a current cycle is normal, a second control data packet with the first control data packet, maintain, when the check information of the first control data packet of the current cycle is abnormal the second control data packet at a state of a previous cycle, restore a clock signal from the clock training packet, and restore control data of the second control data packet and display data of the display data packet; and a display data processing block configured to output a source signal by using the clock signal, the control data, and the display data.

11. The source driver of the display device of claim 10, wherein, when a value of the check information of the first control data packet of the current cycle is different from a value of check information before transmission, the clock-data restoring block determines that the value of the check information is not satisfied with a preset condition and thus the check information is abnormal.

12. The source driver of the display device of claim 10, wherein the check information is configured using a plurality of bits included in the control data of the control data packet.

13. The source driver of the display device of claim 12, wherein the check information is composed of a plurality of consecutive bits in bits of the control data.

14. The source driver of the display device of claim 12, wherein the check information is composed of a plurality of bits including at least one non-consecutive bit, among the bits of the control data.

15. The source driver of the display device of claim 10, wherein the clock-data restoring block recognizes, as the check information, a plurality of consecutive bits arranged at predetermined positions in bits constituting the control data packet, and the check information is arranged between the bits of the control data packet or in either a first order or a last order of the bits of the control data packet.

16. The source driver of the display device of claim 10, wherein, after all display data of a display data packet of the current cycle is inputted, the clock-data restoring block updates the second control data packet into the first control data packet.

17. The source driver of the display device of claim 16, wherein the clock-data restoring block uses the second control data packet, which is updated or maintained in the current cycle, to control display data of the display data packet of a next cycle.

18. A packet recognition method of a display device, comprising:

a step in which a timing controller configures a control data packet including check information and transmits transmission data cyclically including the control data packet;

a step in which a source driver receives the transmission data and determines whether the check information of a first control data packet of a current cycle is normal;

a step in which, when the check information of the first control data packet of the current cycle is normal, the source driver updates a second control data packet into the first control data packet; and a step in which, when the check information of the first control data packet of the current cycle is abnormal, the source driver maintains the second control data packet at a state of a previous cycle.

19. The packet recognition method of the display device of claim 18, wherein the timing controller configures the check information by using a plurality of bits included in control data of the control data packet, and the check information is composed of a plurality of consecutive bits in bits of the control data.

20. The packet recognition method of the display device of claim 18, wherein the timing controller configures the check information by using a plurality of bits included in control data of the control data packet, and the check information is composed of a plurality of bits including at least one non-consecutive bit, among the bits of the control data.

* * * * *